United States Patent [19]

Siilats

[11] 4,288,277
[45] Sep. 8, 1981

[54] MOLDING SYSTEM WITH RETRACTING MOLD

[76] Inventor: Lembit Siilats, 37 Bingham Ave., Toronto, Ontario, Canada

[21] Appl. No.: 58,137

[22] Filed: Jul. 17, 1979

[51] Int. Cl.³ .................... B65H 81/00; B29C 1/00
[52] U.S. Cl. .................... 156/425; 156/431; 249/180; 425/DIG. 14
[58] Field of Search .......... 156/425, 429, 175, 446, 156/173, 191, 415, 417, 418, 416, 428, 431; 242/110, 110.1, 110.2, 110.3, 115, 7.02, 7.21, 7.22, 7.23, 72 R; 52/64, 65, 247; 249/180, 181, 209, 125; 425/468, 403

[56] References Cited

U.S. PATENT DOCUMENTS

| | | | |
|---|---|---|---|
| 2,950,071 | 8/1960 | Tidland | 242/110.1 |
| 3,143,306 | 8/1964 | Dijkmans et al. | 249/181 |
| 3,255,976 | 6/1966 | Mede | 242/7.21 |
| 3,367,815 | 2/1968 | Ragettli et al. | 156/175 |
| 3,380,675 | 4/1968 | Baxter et al. | 156/425 |
| 3,470,656 | 10/1969 | Clements | 156/175 |
| 3,754,717 | 8/1973 | Daidla | 156/425 |
| 3,814,374 | 6/1974 | Beemer et al. | 249/180 |
| 3,914,151 | 10/1975 | Poulsen | 156/425 |

Primary Examiner—Michael W. Ball

[57] ABSTRACT

A molding system for molding large diameter chimney liners of fibreglass reinforced plastic (FRP) utilizes a vertically oriented cylindrical mold for use in combination with a working platform mounted on a vertical ram. The mold is of modular construction, having a plurality of axially spaced-apart spiders, each spider being segmented into a plurality of adjoining triangulated segments to form a polygon, to the outer sides of which are attached chordal segments to complete the circular form of the spider. Vertically axially extending ribs interconnect the spiders, with a flexible skin being applied thereabout. The provision of expansion means on the spiders increases the diameter of the mold to its working diameter, so that, upon completion of molding a liner, the action of the spider expansion means is reversed, causing contraction of the mold sufficient to facilitate ready axial separation of the mold and liner. The modular construction of the mold, including radial adjustability of the spider segments permits the mold to be built up to different selected diameters so that liners having a size range between 20 feet and 30 feet diameter may be readily fabricated using one basic mold.

7 Claims, 6 Drawing Figures

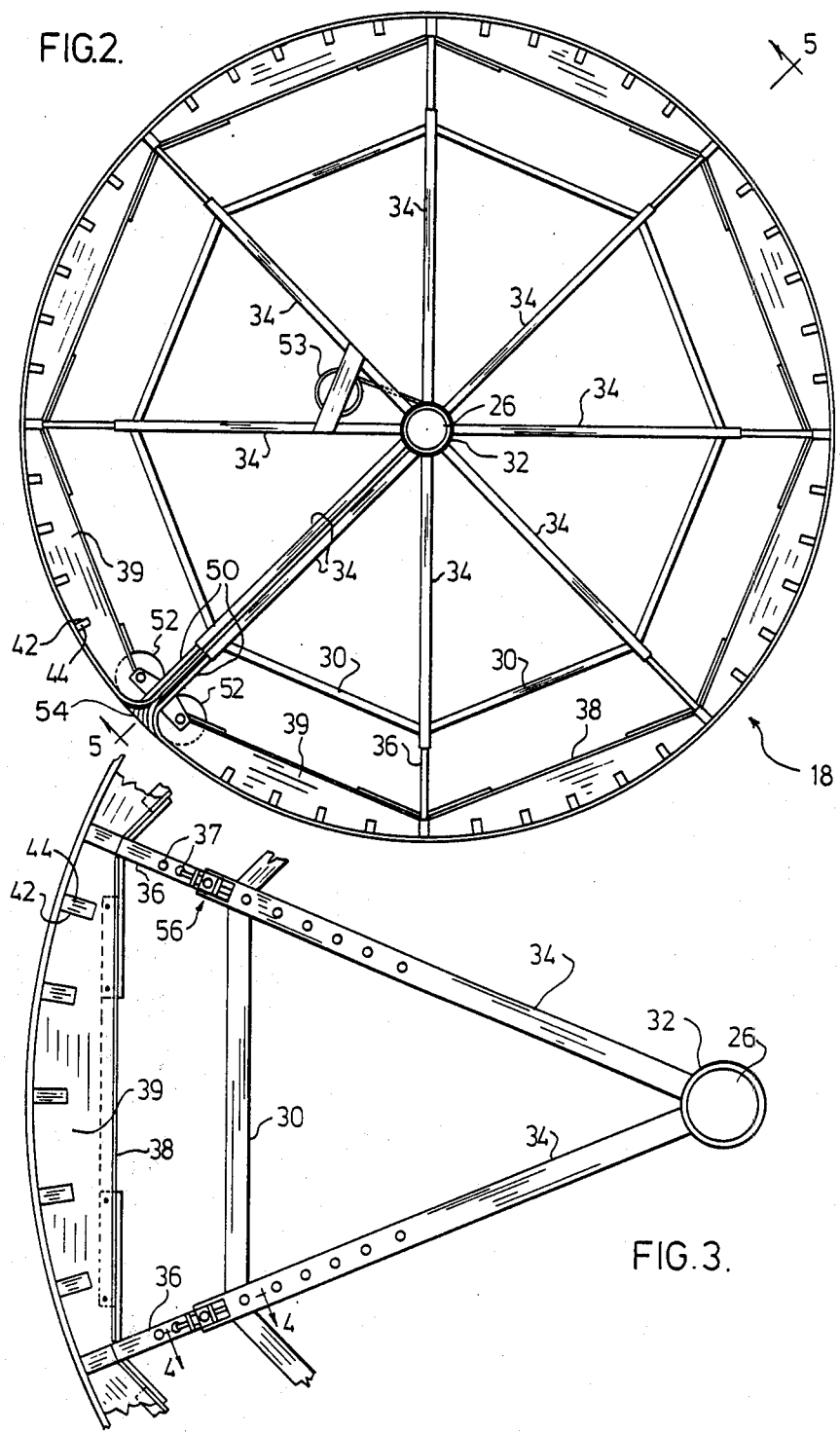

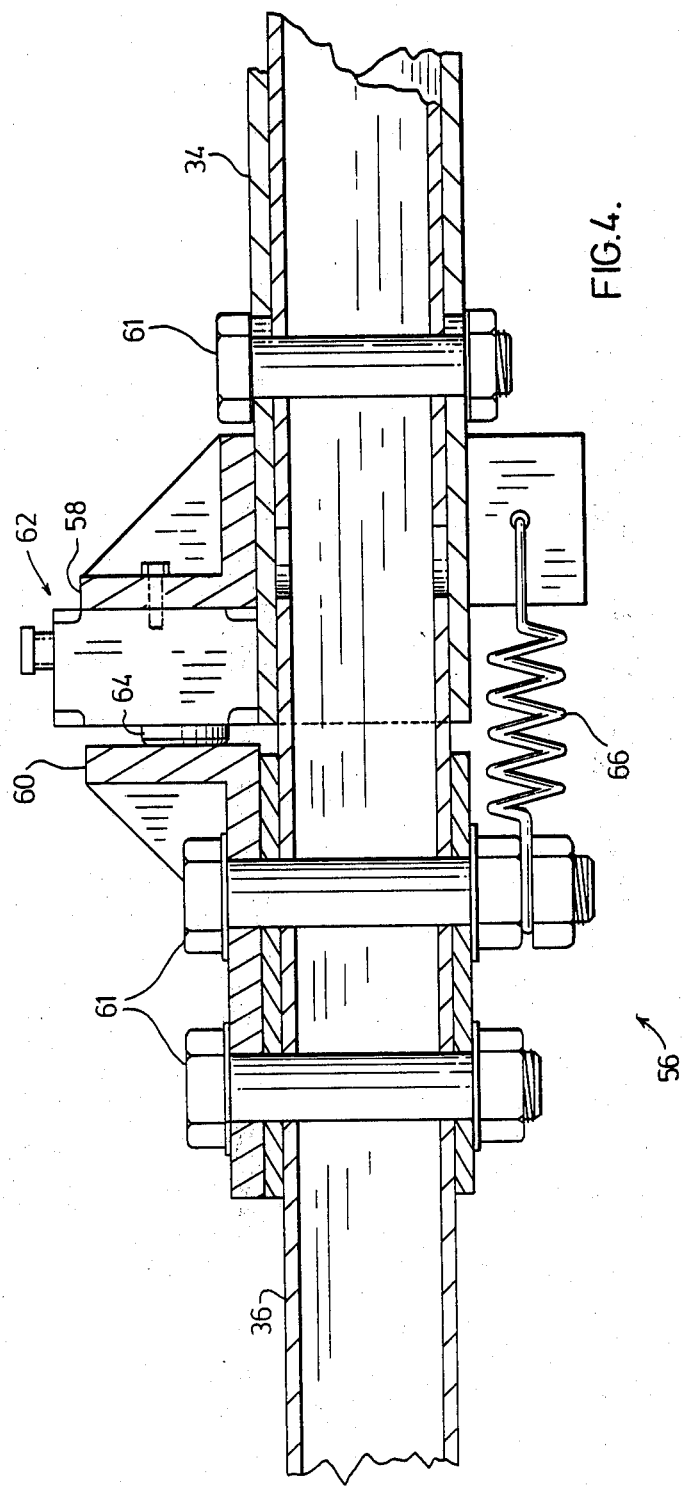

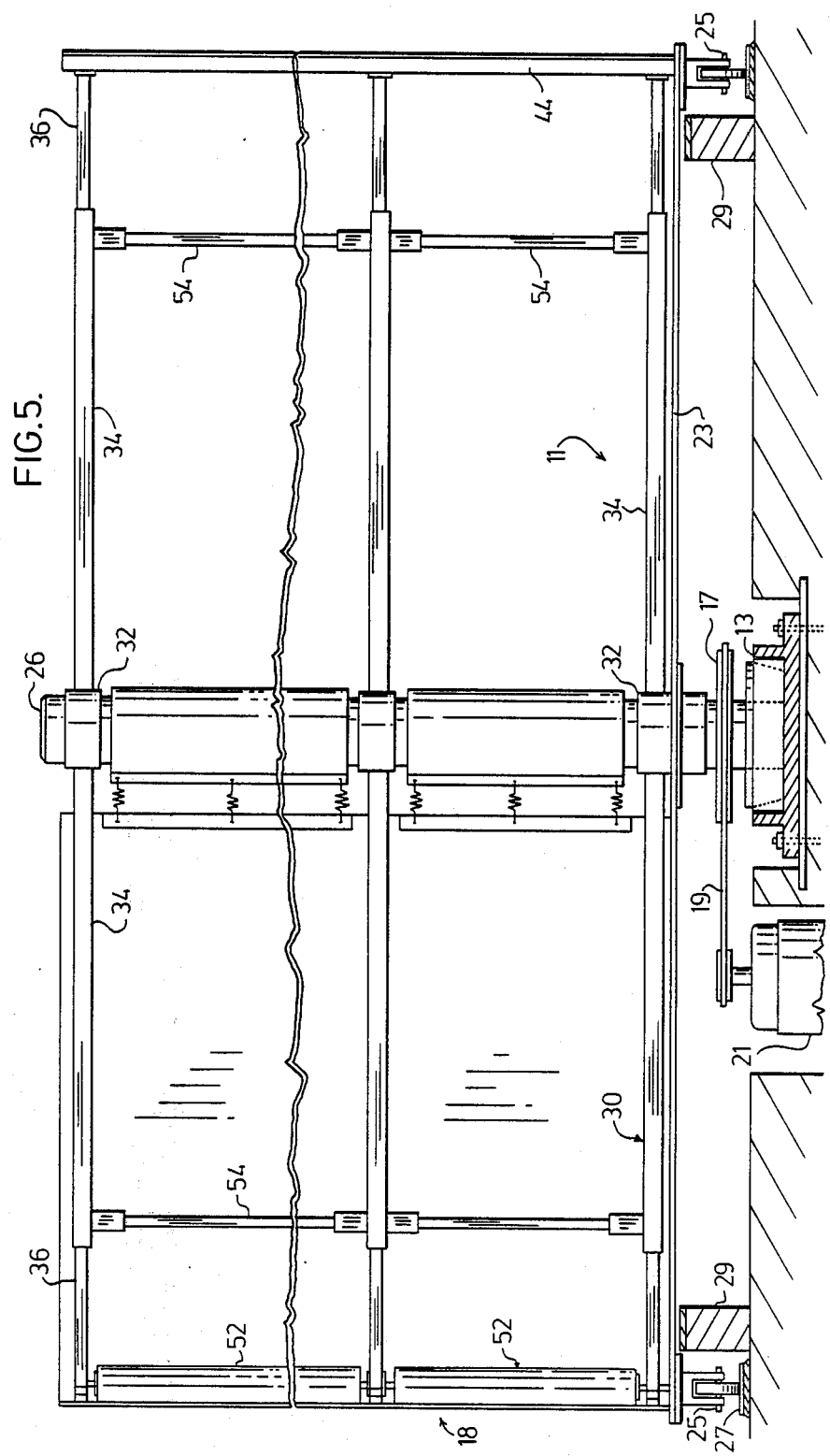

MOLDING SYSTEM WITH RETRACTING MOLD

This invention is directed to a molding system for molding large diameter reinforced cylindrical liners, including an improved mold, and an arrangement of elements for use therewith in producing the liners.

The use of chimney liner fabricated of fibreglass reinforced plastic (FRP) has recently encountered a large upswing in view of increased coal utilization stemming from current oil shortages.

Such FRP liners are attractive to use because of their resistance to sulphur dioxide and other acidic combustion by-products, as well as possessing an inherent insulation value to maintain more constant the temperature of flue gases.

However, with the need to provide FRP liners ranging in diameter generally between 20 and 30 feet, (6 to 9 meters), having a thin-walled construction, difficulties are experienced in stripping the molded liners horizontally from off the mold.

Current molding practices encompasses horizontally extending molds of about 30 feet (9 meters) axial extent mounted upon stub axles extending from the ends of the mold to phenolic bearings spaced about 50 feet (15 meters) apart. This axle extension permits a stripping clearance at the axial end of the mold, for removing the liner axially at least partially from off the mold.

This type of arrangement, wherein the mold is segmented in order to facilitate transportation, results in a mold having a total of about 2500 component parts, and weighing in the order of 20 tons (18,000 kilograms).

In addition to the foregoing requirements, such an arrangement also requires the provision of two stripping jacks, for raising the mold and liner, to permit the insertion of a liner stripping dolley beneath the liner, and two intermediate mold support stands to facilitate removal of one of the mold support bearings for completing removal of the liner axially from off the mold, with the aid of a tractor.

This prior system is costly to provide, requires a large working area and a building of about 70 feet in width, 40 feet in height and 120 feet in length (approx. $21 \times 12 \times 36$ meters), and is time consuming, cumbersome and on occasions somewhat dangerous in use. The necessary collapsing of such existing molds to permit liner withdrawal is achieved by the provision of an axial hinge securing adjacent peripheral segments of the mold, with hydraulic actuators providing inward retracting collapse of the mold wall.

Certain of the disadvantages attributed to this type of prior art arrangement are:

1 retraction clearance is not uniform, owing to the limited number (two) of support segment portions:

2 hang-up of the liner on the mold can create consequent damage and danger:

3 necessity for installing steel stiffener rings about the liner prior to withdrawal of the liner from the mold requires manipulation of the liner and the mold in order to locate the rings in segments about the liner, with a complex jacking requirement in order to support the mold as the liner is withdrawn.

The adoption in this present invention of a mold having vertical orientation provides particular advantages in the case of large diameter thin walled casings that are subject to buckling collapse when horizontally oriented, as the vertical orientation minimizes transverse (diametrical) distortion forces acting on the casing.

The vertically axised mold per se is inherently self supporting and may be made of relatively light construction, owing to its vertical orientation.

The effects of winding tensile forces may be minimized as opposed to the prior art arrangements, wherein winding forces tend to supplement the diametrical liner collapse forces due to self-weight.

The provision of modular spiders having fluid powered expanders actuable in radial expansion mode prior to winding the liner on the mold serves to provide a predetermined extent of retraction "allowance," ensuring a substantially uniform radial retraction of the mold inwardly from the wound liner upon de-energization of the expanders, to facilitate ready vertical separation of the mold and the formed liner.

The adoption of selectively adjustable spider modules permits use of the basic mold to encompass a significant range of liner sizes, with minimum cost or lost time required to provide preliminary setting up of the spider frames, and to provide the requisite complementary parts necessary to complete the desired mold comprising supplementary module segments together with axial ribs and a tensioned mold cover.

In preparing the subject mold for a predetermined diameter of liner, the axially spaced spider modules are each modified by manual adjustment of the radial arms using pinned sliding joints to achieve the desired radius for the spiders. The outer chordal rib of each spider module is correspondingly adjusted in length to accord with the selected spider diameter. Each module is then provided with a predetermined replacement outer segment form secured to and complementary to the selected chordal rib length so as to complement the polygonal spider to form the desired circle. Axially extending wooden ribs are then secured about the spiders extending between the outer segments to provide a substantially complete stiff cylinder frame.

Using the cylindrical, rotatable mold as on a lathe, with one or more cutting tools mounted upon and reciprocating axially with the work table and operating against the surface of the mold the desired true cylindrical surface can be readily generated.

A plastic or other flexible wrapping diaphragm is then passed around the cylinder, having at least one of the ends thereof secured to a tensioning roller, by means of which a desired degree of pre-tension is applied to the wrapping. In order to condition the prepared mold preparatory to the commencement of fabricating a liner thereon, fluid pressure is applied to a manifold interconnecting the fluid powered expanders of each spider. The pressure fluid expands the spiders radially by a predetermined retraction clearance, thereby increasing the loading of retraction springs. The expanders are then isolated from the fluid supply, to maintain the mold in expanded condition, and the molding operation then proceeds with the application of a suitable slip agent, prior to the building up of the FRP liner, using known FRP molding techniques.

While vertical mold systems are known, such as Mede, U.S. Pat. No. 3,255,976, June 14th, 1966, and Luckett et all, U.S. Pat. No. 3,928,104 Dec. 23rd, 1975, the present arrangement provides particular and unobvious advantages in the fabrication of liners having the recited characteristics. Thus, by mounting the rotatable mold platform below ground level such that the top of the mold is more or less flush with the ground, an FRP applying work station is arranged on a worktable vertically displaceable on a ram oscillating vertically, parallel with the axis of the platform. The worktable also includes one or more tool stations, having a lathe tool, milling or suitable grinding tools for preparing the surface of the mold to the required cylindrical form by machining of the vertical ribs upon rotation of the mold and vertical oscillation of the tool with the work table.

The handling of mold components the separation of the fabricated liner from the mold, and the disposition of the liner, is facilitated by a track-mounted gantry crane spanning the pit.

A simple, low cost, bogey-mounted cover positioned beneath the crane on tracks located between the crane tracks can obviate the need for a permanent building.

Thus, for on-site fabrication one low cost embodiment provides sliding disposable covers located beneath a gantry crane, operating in co-operation with a simple low cost turntable located in a work pit below ground level.

Certain embodiments are described, reference being made to the accompanying drawings, wherein;

FIG. 2 is a plan view of the subject mold;

FIG. 3 is an enlarged view of a portion of FIG. 2;

FIG. 4 is a view at 4—4 of FIG. 3;

FIG. 5 is a diametrical sectional elevation of the mold turntable arrangement.

Figure 1:
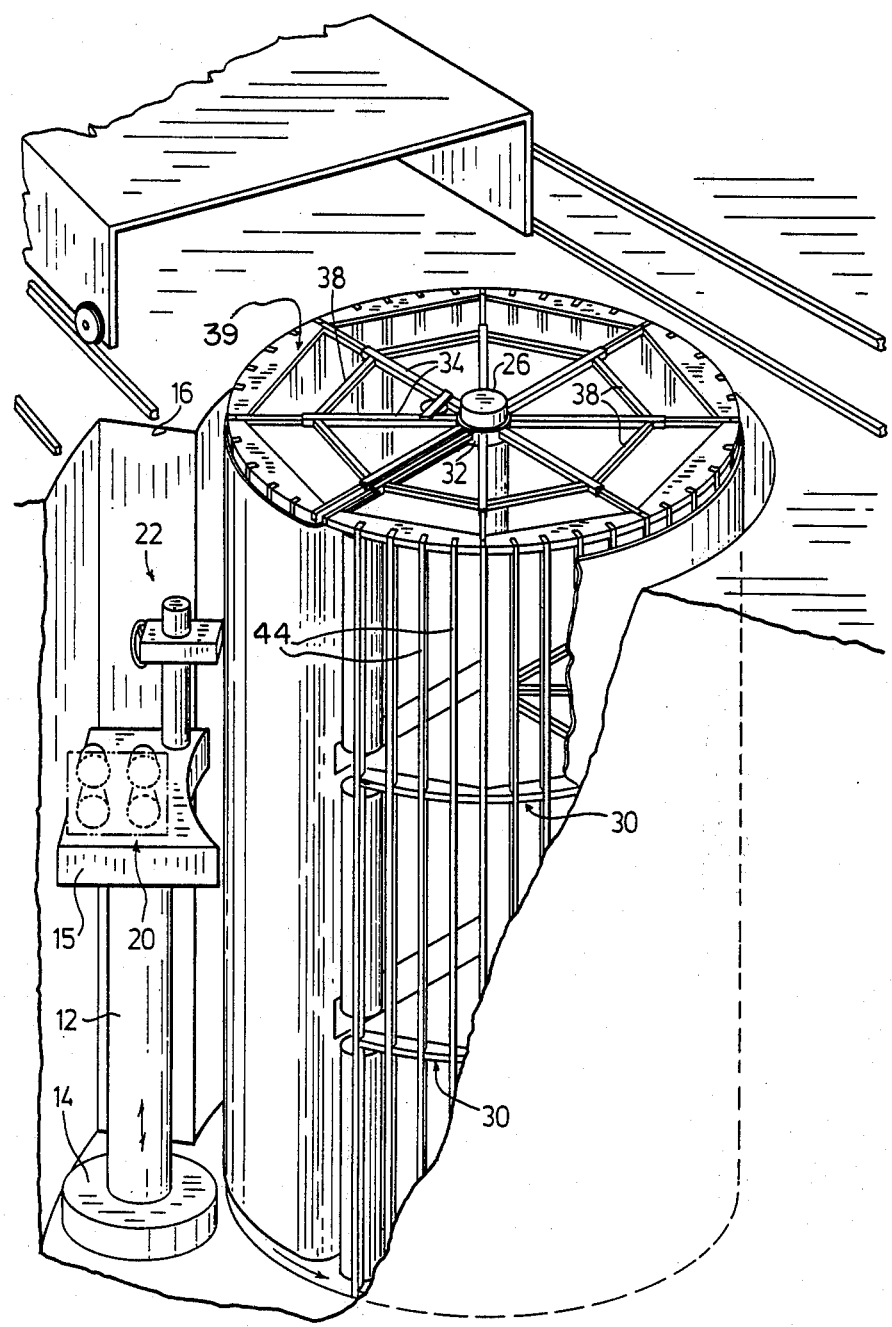
FIG. 1 is a general view of a portion of the subject system.
Figure 6:
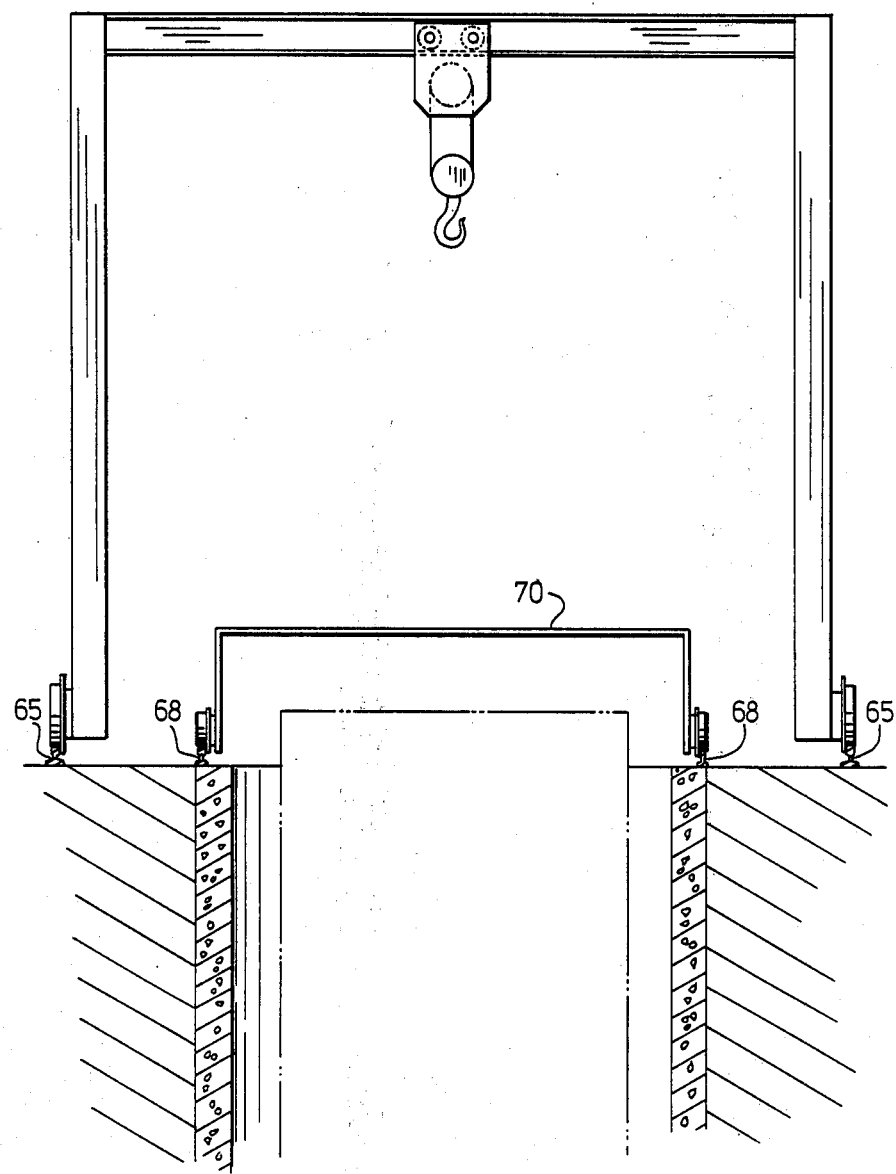
FIG. 6 is a view showing the gantry crane arrangement with the removeable pitcovers.

Referring to FIGS. 1 and 5 the arrangement 10 comprises a pit mounted turntable 11 having an adjacent ram 12 mounted in a hydraulic cylinder 14, the ram 12 extenting substantially parallel with the polar axis of turntable 11 having control means (not shown) to oscillate the work table 15 upwardly and downwardly at desired rates in the work pit 16. The subject mold 18 is assembled on turntable 11, co-axially therewith.

The turntable 11 has a central post 26 carried on thrust bearing 13, having a driving gear 17 connected by chain 19 to variable speed motor 21. The working surface 23 of turntable 11 is supported on a plurality of casters 25 running on a circular track 27. A magnetic brake 29 working on the under surface of working surface 23 provides accurate control of the turntable.

The worktable 15 is centered in co-axial relation with the ram 12 having one filament feed and wet box working station 20 mounted thereon, and is provided with a tool station 22 for finishing the peripheral surface of the axial ribs 44 of mold 18 to a cylindrical form. The lathe turning effect is achieved by rotation of the turntable 11 bringing the tool at station 22 into cutting relation with the ribs 44, and oscillating the work table 15 as required to complete the operation.

Referring also to FIG. 2 the mold 18 has a central post 26 on which a number of axially spaced spiders 30 are mounted by way of a sleeve 32.

Each spider 30 has a plurality of radial arms 34 of tubular form secured to the sleeve 32, each arm 34 having an extension 36 extending therefrom and secured by bolts 37, the radially outer ends of extensions 36 being interconnected by chord ribs 38 which are selectively extensible by adjustment means, permitting selective adjustment in length to the chord ribs 38 as dictated by the selected radial positioning of the chord ribs 38 when the radial arm extensions 36 are adjusted to a desired mold diameter.

Each chord rib 38 is provided with a complementary segment 39 generally a wooden former, of arcuate segment so as to complete the desired circle in dimension and form. A series of slots 42 spaced around the perimeter of formers 39 receive axial ribs 44 which extend generally for the full length of the mold 18 in interconnecting relation between the spiders 30.

In the instance of the adjoining segments of FIG. 2 it will be seen that the pairs of adjacent radial arms 34 provide a radial passage within which the ends of an outer skin 50 are entered, being guided on rollers 52 carried by respective ones of the chord ribs 38. A filler piece 54 bridges the peripheral gap in the skin 50 adjacent rollers 52. A tensioning roller 53 receives the split ends of the flexible skin 50. Axial spacers 54 interconnecting the respective arms 34 maintain the spiders 30 in axially spaced apart relation.

Referring to FIGS. 3 and 4, each radial arm 34 has an expansible actuator means 56 connecting the radially outer portion of arm 34 with the radially outer extensions 36. Angle brackets 58, 60 secured to the respective arm portions by bolts 61 contain a fluid actuated short stroke piston and cylinder expander actuator 62 having the piston 64 abutting the bracket 60 in thrust transmitting relation therewith. A return spring 66 interconnects the arrangement, to provide return action to extension 36 in opposition to the expansion action of actuator 62. It will be understood that as an alternative to the provision of springs 66 the actuator 62 can be made double acting.

The limited radial expansion provided to the radial arms 34 of each spider segment constitutes a mold contraction allowance.

In operation, to set up the mold for a predetermined diameter of FRP liner the radial extension arms 36 of each spider 30 are set manually to a desired value by adjustment of securing bolts. This also requires adjustment of the length of the chord ribs 38, using bolts 42 in selected apertures 40. Selected complementary segments 39 having an outer arc of curvature for the desired liner size are installed, and axial ribs 44 installed.

The actuators 62 are connected to a source of fluid pressure (not shown) so as to take-up the mold radial contraction allowance, as the actuators 62 expand outwardly, thereby increasing the tension in return springs 66.

The actuators 62 are then sealed, by way of a suitable control valve, to maintain them locked in the expanded condition.

The mold 18 may then be peripherally profied, using the cutting tool at tool station 22 on platform 20 in conjunction with oscillation up and down the rotational displacement of the mold to provide a desired degree of smoothness and cylindrical surface to the radially outer edges of ribs 44 and wooden formers 39. The outer skin 50 is then installed in tensioned relation about the framework of the mold, and the mold is in condition for use.

With the mold thus prepared, the system is operated using one working station 20 having filament feeds and one or more wet boxes, as is well known in the art, to build up a pattern of FRP material in desired patterns by controlling the rate of rotation of the turntable and mold driven by motor 24, together with vertical oscillation by way of ram 12, in synchronized relation with rotation.

Upon termination of liner fabrication, which generally includes automatic self-curing, the liner is secured to the gantry crane, the mold contracted by releasing fluid pressure from the expansion actuators 62 to permit the retraction springs 66 to contract the mold radially. The provision of spring tension to the outer skin further assists the contraction of the mold when the expansion actuators are depressurized. The gantry crane lifts finished liner from the mold pit and removes the liner clear of the working area, and work on a succeeding liner can commence immediately, or the mold changed to a different desired size.

Between the tracks 65 of the gantry crane, which straddles the installation containing the mold on its turntable, and the working table mounted on its ram, all within the pit, there is located a narrower track 68, also straddling the installation, carrying a pair of half covers 70 which draw together and provide protection from the elements. These withdrawable half-covers comprise a low cost substitute in place of a building, so that the present invention may be used on location, with a minimum of capital investment, the structure generally being sufficiently light to be rolled back by hand to uncover the pit, to provide access for the gantry crane, the cost of the structure generally not warranting transport to a new location of the plant, as it may comprise timber and plastic sheeting.

It will be seen that the present invention provides a very low cost installation comprising an excavated pit to receive the hydraulic ram, turntable and driving motor therein, having a low cost track and thrust bearing to support the turntable.

What I claim by Letters Patent of the United States:

1. A radially retractable and expansible cylindrical mold of modular form having an axially extending support means; a plurality of spider means mounted in mutual axially spaced relation on the support means, the spider means including radially extending arms having segment portions arcuately arranged thereabout in secured relation therewith; axially extending rib means interconnecting said segment portions to provide a support form of substantially cylindrical shape; said arms including individual fluid pressure actuator means to extend the arms radially outwardly upon pressurization of said actuator means, to increase the effective diameter of said cylindrical shape, flexible wrapping diaphragm means positioned in wrapped covering relation about said rib means, and means to tension said wrapping means to receive in use molding material in support relation therewith.

2. The mold as claimed in claim 1, said spider means including adjustment means for incrementally increasing the radial dimension of said spider means to increase the effective diameter of said mold to a predetermined value.

3. The mold as claimed in claim 1, including spring means positioned in tensioned relation to oppose the action of said expansible actuators, and to retract said actuators and portions of said spiders radially contracting relation upon release of pressure fluid from said actuators.

4. The mold as claimed in claim 1, each said spider comprising a plurality of adjoining segments each having a pair of substantially radially extending arms, means for adjusting the length of each said arm by predetermined increments, a chord rib joining the radially outer ends of said pair of arms, and chord adjustment means permitting adjustment of the length of said chord rib commensurate with predetermined changes in the radial dimension of said spider means.

5. The mold as claimed in claim 1 in combination with a turntable to support said mold in vertically extending relation thereon, and reinforcement applying means for applying reinforcing material in predetermined wound relation on the mold.

6. The combination as claimed in claim 5, said reinforcement applying means being mounted on ram means for periodic vertical displacement when in use, said turntable moving said mold in rotating displacement relative to said axially displaced reinforcement winding means.

7. The combination as claimed in claim 6, including crane means to secure a cylinder fabricated on said mold, for removal of said cylinder axially from the mold upon contraction of the mold, and displaceable cover means in selectively removeable relation over a pit containing said mold.

* * * * *